2 Sheets—Sheet 1.
G. BRODIE.
METALLIC TIE FOR BALING.
No. 23,291. Patented Mar. 22, 1859.
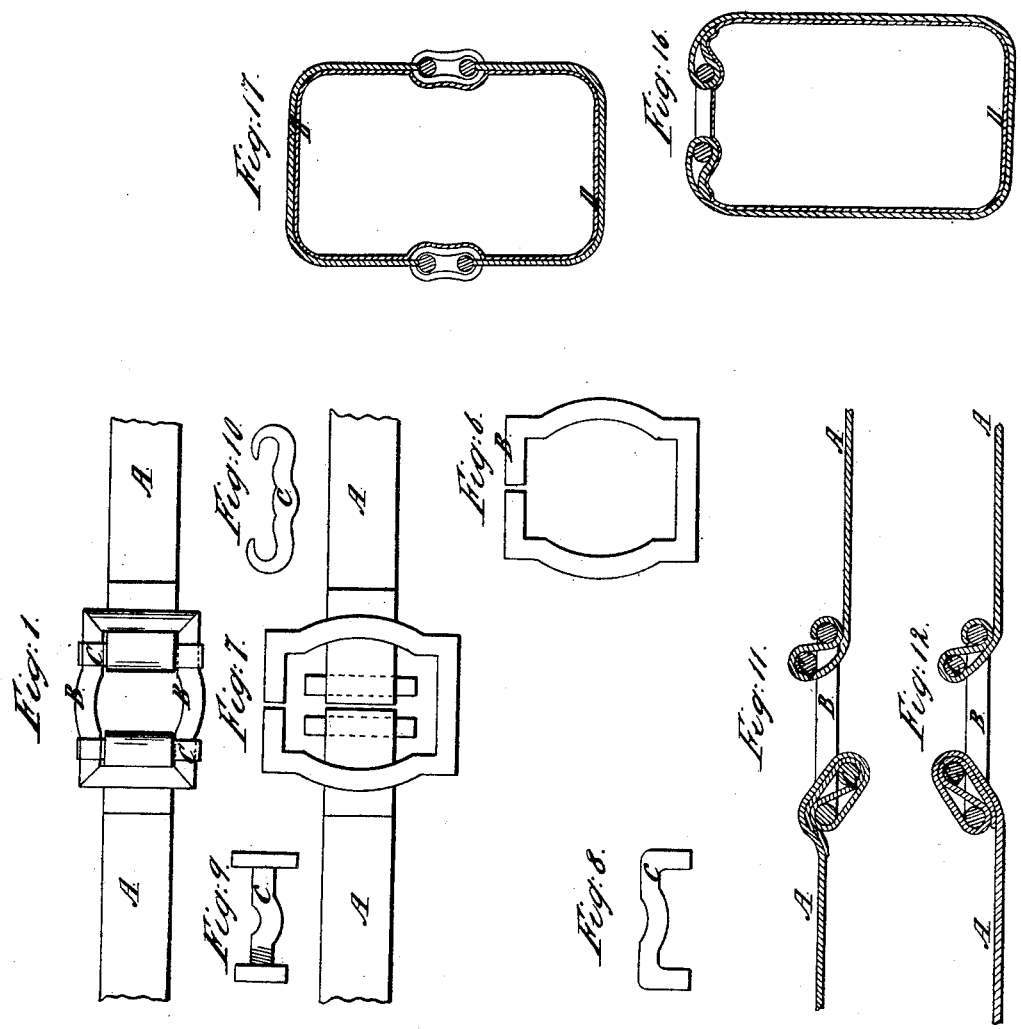

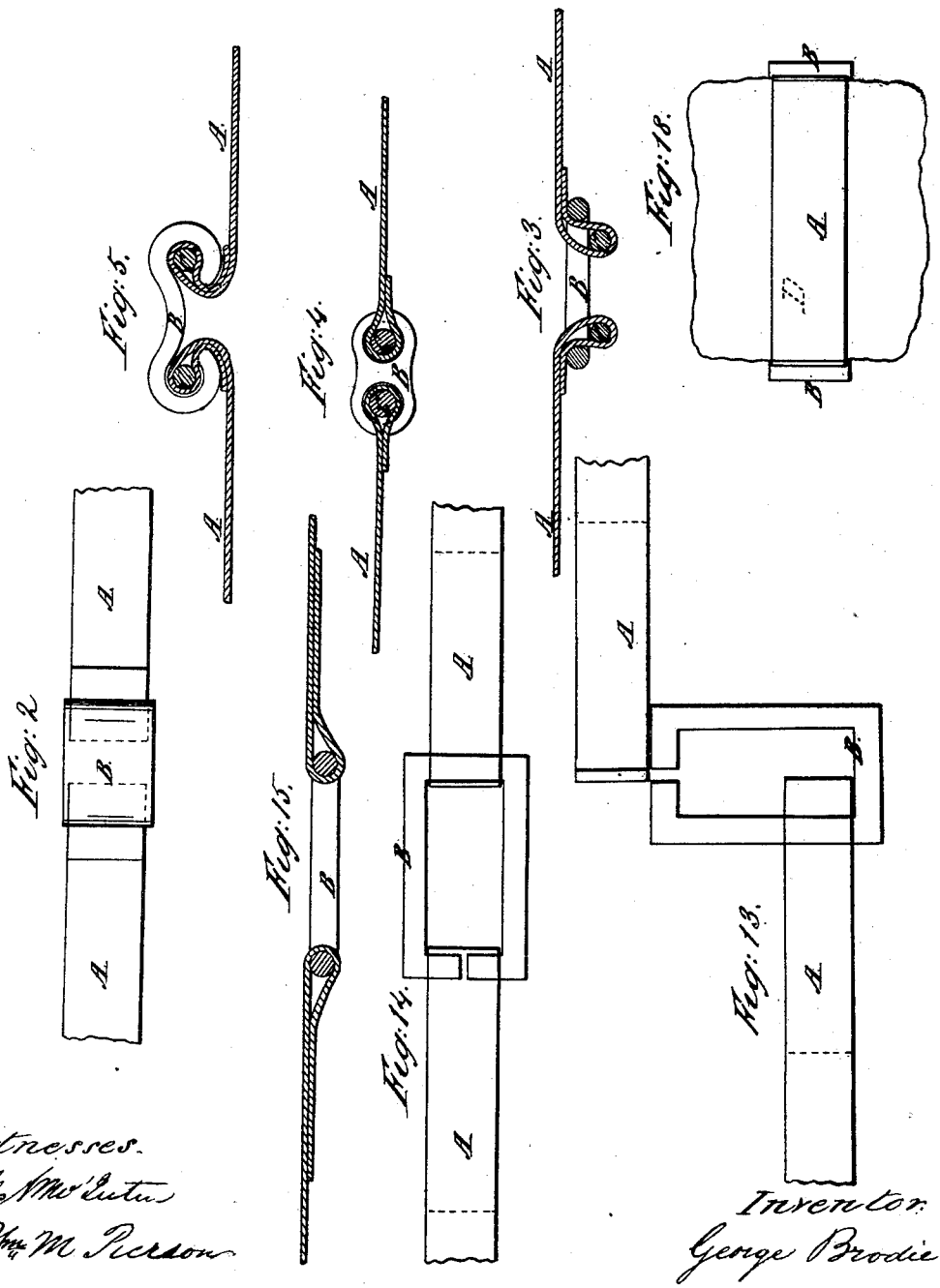

UNITED STATES PATENT OFFICE.

GEORGE BRODIE, OF LITTLE ROCK, ARKANSAS.

IMPROVEMENT IN METALLIC BANDS FOR BALING.

Specification forming part of Letters Patent No. 23,291, dated March 22, 1859.

*To all whom it may concern:*

Be it known that I, GEORGE BRODIE, of Little Rock, in the county of Pulaski and State of Arkansas, have invented a new and Improved Device for Tying Metallic Bands for Baling; and I do hereby declare the following is a full, clear, and exact description of the same, reference being had to the annexed drawings, making a part of this specification, in which—

Figure 1 is a flat view of my improvement and invention, and Fig. 3 is an edge view of the same for one kind of connecting-link, and Fig. 2 is another flat view of my improvement and invention, and Figs. 4 and 5 are edge views of the same, with different-formed connecting-links. Fig. 6 is a flat view of the connecting-link used in Figs. 1, 3, 11, 12, 13, 14, 15, 16, and may be used instead of 4 or 5 in Figs. 17 and 18. Fig. 7 shows how the connecting-link, Fig. 6, is first intended to be applied. The ends of the hoop or band, with its inserted pins, are brought together after being passed around the bale, the link is laid lengthwise over and across the ends of the band with its inserted pins, the link is then turned, as in Fig. 1, when its length will be in line with the length of the hoop, when the prepared ends of the hoops with pins are drawn to the ends of the link, when one end of the hoop is bent around the jointed end of the connecting-link, as shown in one end of Fig. 11, which keeps the link from turning, and also strengthens and keeps the jointed ends of the link better in place. The other end of the hoop can also be bent in the same manner, if desired, which will prevent it from getting loose or unhooked. Figs. 8, 9, and 10 show how the pins may be made with depressions and elevations, with heads and nuts, or with side guards, around which pins the bent ends of the hoops are securely pressed and made to fit close, which prevents the pins from getting out of place. Figs. 11 and 12 show how the end of the hoop may be bent differently around the open end of the connecting-link, thereby strengthening the open end of the connecting-link and holding it securely in place. Figs. 13, 14, 15, and 16 show how the connecting-link B, Fig. 6, may be used without any pin, C. The ends of the hoops are bent as in Fig. 15, the connecting-link is slipped into the bent ends of the hoop as shown in Fig. 13, the link is then partly turned, and is on a line with the hoop, as shown in Fig. 14, and the hoop thus united on the side of the bale is then drawn to the upper or under side of the bale while in the press, as shown in Fig. 16, and the elastic expansion of the bale when taken out of the press presses the bent ends of the hoops together and prevents them from slipping. Fig. 17 shows how bales are bound by using a tie on each side of the bale. This is done when bales are intended to be again pressed into smaller bulk, for the purpose of facilitating the second tying of the metallic bands without injuring them. Fig. 18 is a flat view of a strip of cloth, paper, or other suitable material the length, or longer, than the hoops. It is marked D, and lies between the hoop and the bale.

The letters D in Figs. 16 and 17 are colored edge views of the same. These strips are intended to prevent the hoops from injuring the covering around the bale and also the material baled.

Similar letters of reference indicate corresponding parts in all the figures.

The object of this invention is to enable large and smaller bales to be tied without cutting or injuring the hoops, as no short or acute bends are required, all of which short or acute bends weaken and injure the hoops, and also to draw the tie tighter when the strain upon the hoop is increased, so that when bales of cotton or other substances that require to be compressed again into less than their original bulk the same hoops can be used without cutting or injuring them, and may be used for baling a great many different times and on different bales.

To enable others skilled in the art to make and use my invention, I will proceed to describe its construction and operation.

The A in all the figures are flat or edge views of the hoop.

The letter B in all the figures snow how and what different formed connecting-links may be used in my device, although all of them embrace the main principle of forming the tie, which is done by bending the ends of the hoops and inserting within the bends a proper formed and sized metallic pin, making the pin longer than the width of the hoop, as in Figs. 1, 3, 7, 8, 9, 10, 11, and 12, all of which ties have the pins C longer than the width of hoop. The pin, if liable to work out of place, can be formed with its ends bent as in Fig. 8, making side guards for the links, or they may be made with depressions or elevations, as shown in Figs. 8, 9, and 10, or with head and nut, as shown in Fig. 9, or with the ends bent around the side of the connecting-link, as shown in Fig. 10, which will keep the open end of the connecting-link from opening.

Fig. 6 is a flat view of the connecting-link used in Fig. 1, which link is made by bending suitable-sized metallic wire, making the opening in the middle of the link greater than at its ends, so as to enable it to turn easy around the prepared ends of the hoops, and making the ends of the metallic rod forming the link meet at or near the middle of one end of the connecting-link, when its ends may be jointed and fastened together by well-known means; or it may be used without any such fastening.

In Figs. 2, 4, and 5 the connecting-links are made about the same width as the hoops; but instead of, as in Figs. 1 and 3, where the width of the ends of the hoop or length of the pins keep the hoops from pulling out of the connecting-links, the hoops are bent in the ends, as in Figs. 1 and 3, and the pins are inserted as in the first instance; but they are intended only to make the hoops thicker at each end, so that they cannot pull out of the links, as shown in Figs. 4, 5, and 2, as the open ends of the links will only allow the double thickness of the hoops to enter, and, as the ends of the hoops are thicker by the size of the pins, they cannot pull out, but the more strain upon the hoops the tighter are they held in the link.

The pins may be cut in length just the width of the hoops when held by its thickness, and the pins kept from working out of the hoops by depressions on each side of the pin and the hoop pressed into the same; or the pins may be made with heads and nuts, as shown in Fig. 9; or the links can be made closed up on one edge, and a clasp or button made to cover the opposite edge, as shown in Figs. 2 and 4; or they can be made to bend around each edge like Fig. 10.

Having thus pointed out the nature of my invention and how the same may be used in various modes with success, I will state what I claim as my invention, and wish to secure by Letters Patent, is—

1. Preparing the hoops or bands for tying before they are passed around the bale by bending one or both ends of the hoops or bands, and placing in the inside of each band a suitably-prepared metallic pin similar to those I have already described, around which pins the bent end of the hoops are securely pressed, for the purpose of keeping the pins in place, and also making the ends of the hoops wider or thicker, as the shape of the connecting-links used may require.

2. Forming the connecting-links like those shown in Figs. 4, 5, and 6.

3. Bending one or both ends of the hoop or band, as shown in Figs. 11 and 12, around the outer ends of the connecting-link, thereby strengthening the ends of the link, preventing it turning or getting out of place and the tie from untying.

4. Making metallic hoops for binding bales with a tie on each side of the bale, for the uses and purposes before expressed.

5. Using strips of cloth, paper, or other suitable material under the metallic hoops, as shown in Figs. 16 and 17, for the purpose described, substantially as herein set forth.

GEORGE BRODIE.

Witnesses:
C. L. JEFFRIES,
J. B. MOORE.